United States Patent
Gao et al.

(10) Patent No.: US 10,185,647 B2
(45) Date of Patent: Jan. 22, 2019

(54) DEBUGGING REMOTE VERTEX CODE ON TEST MACHINE

(71) Applicant: Microsoft Technology Licensing, LLC, Redmond, WA (US)

(72) Inventors: Na Gao, Beijing (CN); Yifung Lin, Beijing (CN); Omid Afnan, Beijing (CN); Dian Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 15/153,581

(22) Filed: May 12, 2016

(65) Prior Publication Data

US 2017/0091076 A1    Mar. 30, 2017

Related U.S. Application Data (60) Provisional application No. 62/233,130, filed on Sep. 25, 2015.

(51) Int. Cl.
*G06F 9/44*    (2018.01)
*G06F 11/36*   (2006.01)

(52) U.S. Cl.
CPC ...... *G06F 11/3664* (2013.01); *G06F 11/3624* (2013.01)

(58) Field of Classification Search
CPC ........................................................ G06F 9/44
USPC ................................................. 717/124–128
See application file for complete search history.

(56) References Cited

U.S. PATENT DOCUMENTS

| | | | |
|---|---|---|---|
| 7,673,178 B2 | 3/2010 | Merriman et al. | |
| 8,302,050 B1 | 10/2012 | Hollander et al. | |
| 8,336,029 B1 | 12/2012 | McFadden et al. | |
| 8,494,940 B1 * | 7/2013 | Phillips | G06Q 40/00 705/35 |
| 8,707,275 B2 | 4/2014 | Mascaro et al. | |
| 8,752,017 B2 | 6/2014 | Hossain et al. | |
| 8,943,475 B2 | 1/2015 | Beatty et al. | |
| 8,972,944 B2 | 3/2015 | Petras | |
| 9,064,049 B2 | 6/2015 | Zinkovsky et al. | |
| 2003/0005102 A1 * | 1/2003 | Russell | G06F 11/0709 709/223 |
| 2005/0050526 A1 * | 3/2005 | Dahne-Steuber | G06F 9/454 717/136 |

(Continued)

OTHER PUBLICATIONS

Smaili, et al., "Setting Break-Points in Distributed Time-Triggered Architecture", In Proceedings of Seventh IEEE International High-Level Design Validation and Test Workshop, Oct. 27, 2002, pp. 57-62.

(Continued)

*Primary Examiner* — Jae U Jeon
(74) *Attorney, Agent, or Firm* — Workman Nydegger (57) ABSTRACT

The supporting of debugging of failed vertex code on a test machine. This debugging is made possible even though the vertex code failed while on a remote processing node, and is but one of multiple, and potentially innumerable vertices that run in a distributed environment. This represents a vast technical improvement over prior ad hoc methods for trying to debug a large distributed application, since time is not wasted on vertices that operated properly, but rather debugging is focused on the problem vertex. Even reproducing the failure is a huge technical step forward.

20 Claims, 5 Drawing Sheets

(56) References Cited

U.S. PATENT DOCUMENTS

| | | |
|---|---|---|
| 2005/0071243 A1 | 3/2005 | Somasekaran et al. |
| 2006/0167950 A1* | 7/2006 | Vertes ................. G06F 11/3476 |
| 2007/0150869 A1* | 6/2007 | Tateishi .............. G06F 11/3688 |
| | | 717/127 |
| 2008/0209423 A1* | 8/2008 | Hirai .................... G06F 9/5027 |
| | | 718/102 |
| 2010/0153771 A1* | 6/2010 | Gordon ............. G05B 19/4185 |
| | | 714/4.1 |
| 2011/0154110 A1* | 6/2011 | Letz .................... G06F 17/5022 |
| | | 714/33 |
| 2011/0191633 A1* | 8/2011 | Archer ................. G06F 11/263 |
| | | 714/32 |
| 2013/0139128 A1 | 5/2013 | Jones et al. |
| 2013/0326487 A1 | 12/2013 | Yousouf et al. |
| 2015/0033078 A1 | 1/2015 | Wintergerst et al. |
| 2015/0169851 A1* | 6/2015 | Boivie ................. G06F 11/362 |
| | | 713/167 |
| 2015/0193328 A1 | 7/2015 | Deakin et al. |
| 2016/0041070 A1* | 2/2016 | Wascat ................... G01M 7/00 |
| | | 702/183 |

OTHER PUBLICATIONS

Liu, et al., "Real-time Application Monitoring and Diagnosis for Service Hosting Platforms of Black Boxes", In Proceedings of 10th IFIP/IEEE International Symposium on Integrated Network Management, May 21, 2007, pp. 216-225.

* cited by examiner

DEBUGGING REMOTE VERTEX CODE ON TEST MACHINE

CROSS-REFERENCE TO RELATED APPLICATION

This application claims the benefit of U.S. Provisional Patent Application Ser. No. 62/233,130 filed Sep. 25, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Computing systems are particularly adept at processing data. When processing large amounts of data (often referred to simply as "big data") that itself might be distributed across multiple network nodes, it is often most efficient to divide data processing amongst various network nodes. For instance, those various network nodes may be processing nodes within a cloud computing environment.

To divide data processing amongst the various processing nodes, the code is compiled into segments called vertices, with each vertex to be assigned for processing on a corresponding processing node. Not only does this allow for efficiencies of parallelizing, but it also allows for the data that is being processed to be closer to the processing node that is to process that portion of the data.

One common programming model for performing such parallelization is often referred to as the map-reduce programming model. In the mapping phase, data is divided by key (e.g., along a particular dimension of the data). In the reduce phase, the overall task is then divided into smaller portions that can be performed by each network node, such that the intermediate results obtained thereby can then be combined into the final result of the overall job. Many big data analytical solutions build upon the concept of map reduce.

When the vertex runs on a processing node, the vertex may, of course, fail (e.g., may not work at all, or otherwise not perform as hoped). This might be due to a coding flaw in the vertex itself. There are a variety of conventional techniques to debug the vertex should this occur. The conventional techniques largely involve trial and error, adding pieces of code that output state that could be helpful in debugging, and the like.

For instance, a developer might add significant logging to capture additional data that may be useful in debugging a future error. When an error occurs the developer might try to inspect many logs to try and identify the location of the error and then its nature. Alternatively, such logging would be added in specific areas after a particular error condition is met. This logging can be more directed but requires rerunning the script or job. Some systems may allow running an individual process in the cloud in a debug state. This would usually require running a sufficiently contained job (few enough nodes or vertices) that a failed node can be easily identified, remotely connected to and debugged. This may require an administrator that has access to the cluster, which may not always be feasible, and might not even be an option for big data solutions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the supporting of debugging of failed vertex code on a test machine. This debugging is made possible even though the vertex code failed while on a remote processing node, and is but one of multiple, and potentially innumerable vertices that run in a distributed environment. This represents a vast technical improvement over prior ad hoc methods for trying to debug a large distributed application, since time is not wasted on vertices that operated properly, but rather debugging is focused on the problem vertex. Even reproducing the failure is a huge technical step forward.

The execution structure generated by a job compiler is used to actually find when vertex code itself is the source of a problem with execution on a processing node. For instance, components on the processing node itself may detect when there are performance problems on the processing node that are actually caused by the vertex code (as opposed to the problems caused by the processing node infrastructure).

In response to identifying that a processing node ran a failed vertex, the vertex code is gathered onto a local test machine, along with at potentially some of the data that the vertex code was operating upon on the processing node. Optionally, state associated with the failed vertex code is also gathered onto the local test machine, such as perhaps identified dependencies, resources used by the failed vertex code when running on the processing node, and so forth. In embodiments in which processing nodes are quickly reclaimed upon completion of execution of a vertex, the vertex code, data operated upon by the failed vertex code, and other state of the vertex code, is rather retained for a period of time, allowing the same to be gathered on a local test machine.

A debugger may then be operated upon the local test machine in evaluating the execution of the failed vertex code as the failed vertex code operates on perhaps the same data and perhaps with the same state as the code was operated on the processing node. Thus, a job provider may debug a job in more a manageable way since the job provider does not need to find the problem vertex, and may instead focus on debugging of the problem vertex. Furthermore, the gathering of vertex code, data, and/or state, may be done after the job provider authenticates, thus allowing for the gathering onto the local test machine without compromising security. Being able to reproduce the problem locally with a debugger to figure out the exact piece of code where the occur occurred and the exact variables and values that led to the error is an enormous technical help in being able to debug software.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to the supporting of debugging of failed vertex code on a test machine. This debugging is made possible even though the vertex code failed while on a remote processing node, and is but one of multiple, and potentially innumerable vertices that run in a distributed environment. This represents a vast technical improvement over prior ad hoc methods for trying to debug a large distributed application, since time is not wasted on vertices that operated properly, but rather debugging is focused on the problem vertex. Even reproducing the failure is a huge technical step forward.

The execution structure generated by a job compiler is used to actually find when vertex code itself is the source of a problem with execution on a processing node. For instance, components on the processing node itself may detect when there are performance problems on the processing node that are actually caused by the vertex code (as opposed to the problems caused by the processing node infrastructure).

In response to identifying that a processing node ran a failed vertex, the vertex code is gathered onto a local test machine, along with at potentially some of the data that the vertex code was operating upon on the processing node. Optionally, state associated with the failed vertex code is also gathered onto the local test machine, such as perhaps identified dependencies, resources used by the failed vertex code when running on the processing node, and so forth. In embodiments in which processing nodes are quickly reclaimed upon completion of execution of a vertex, the vertex code, data operated upon by the failed vertex code, and other state of the vertex code, is rather retained for a period of time, allowing the same to be gathered on a local test machine.

A debugger may then be operated upon the local test machine in evaluating the execution of the failed vertex code as the failed vertex code operates on perhaps the same data and perhaps with the same state as the code was operated on the processing node. Thus, a job provider may debug a job in more a manageable way since the job provider does not need to find the problem vertex, and may instead focus on debugging of the problem vertex. Furthermore, the gathering of vertex code, data, and/or state, may be done after the job provider authenticates, thus allowing for the gathering onto the local test machine without compromising security. Being able to reproduce the problem locally with a debugger to figure out the exact piece of code where the occur occurred and the exact variables and values that led to the error is an enormous technical help in being able to debug software.

Some introductory discussion of a computing system will be described with respect to FIG. 1. Then, the mechanism and methods that enable local debugging of vertices that are components of larger distributed jobs will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
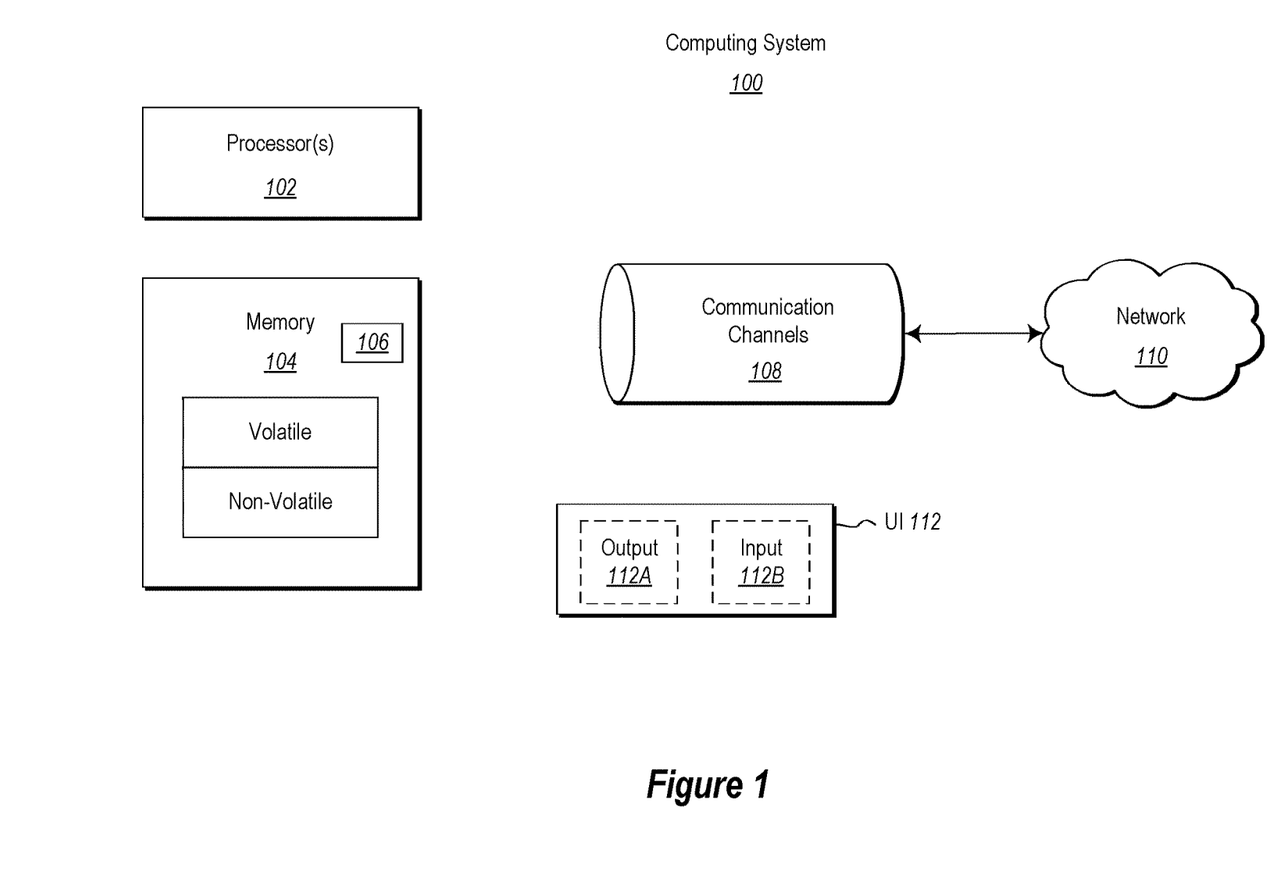
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms and so forth. Examples of input mechanisms 112B might include, for instance, microphones, touchscreens, holograms, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
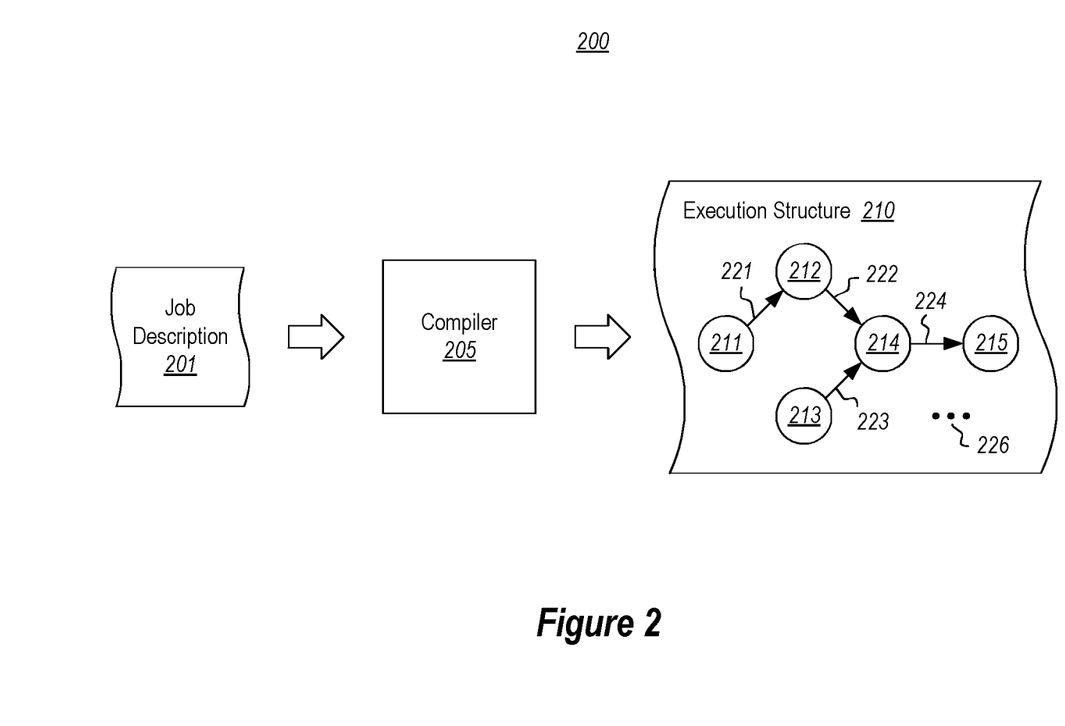
FIG. 2 illustrates an architecture in which a job description is compiled by a compiler into an execution structure.

FIG. 2 illustrates an architecture 200 in which a job description 201 is compiled by a compiler 205 into an execution structure 210. The execution structure 210 has multiple nodes and associated dependencies. Each node represents a set of one or more operations to be performed. The dependencies represent which nodes' operation(s) should be completed first. The compiler 205 also generates binary (also called herein a "vertex" or "vertex code") associated with each node, and which is structured such that, when interpreted by a processing node, causes the processing node to perform the operations represented by the node of the execution structure 210.

The compiler 205 may, for instance, be a computing system such as the computing system 100 described above with respect to FIG. 1. The compiler 205 may alternatively or more specifically be a software component that runs on a computing system such as the computing system 100 described above with respect to FIG. 1. In one example, the job description 201 may be a query. However, the job description 201 may be any definition of a computational job to be accomplished.

In FIG. 2, the execution structure 210 is illustrated as including five nodes 211 through 215 that have certain dependencies represented by arrows 221 through 224. However, the ellipses 216 represent that the principles described herein are not limited to the exact structure of the execution structure 210. The execution structure 210 will depend on the job to be accomplished (i.e., the job description 201), how the compiler 210 decides the job is to divided into smaller vertices, and the dependencies that exist between those vertices.

In the most trivial case, the execution structure 210 may simply be a single node representing a single vertex. In more complex cases, the execution structure 210 may comprise thousands or even perhaps millions of nodes and corresponding vertices. In any case, the principles described herein are applicable regardless of the execution structure, how many nodes exist in the execution structure, and how the nodes are interrelated.

Figure 3:
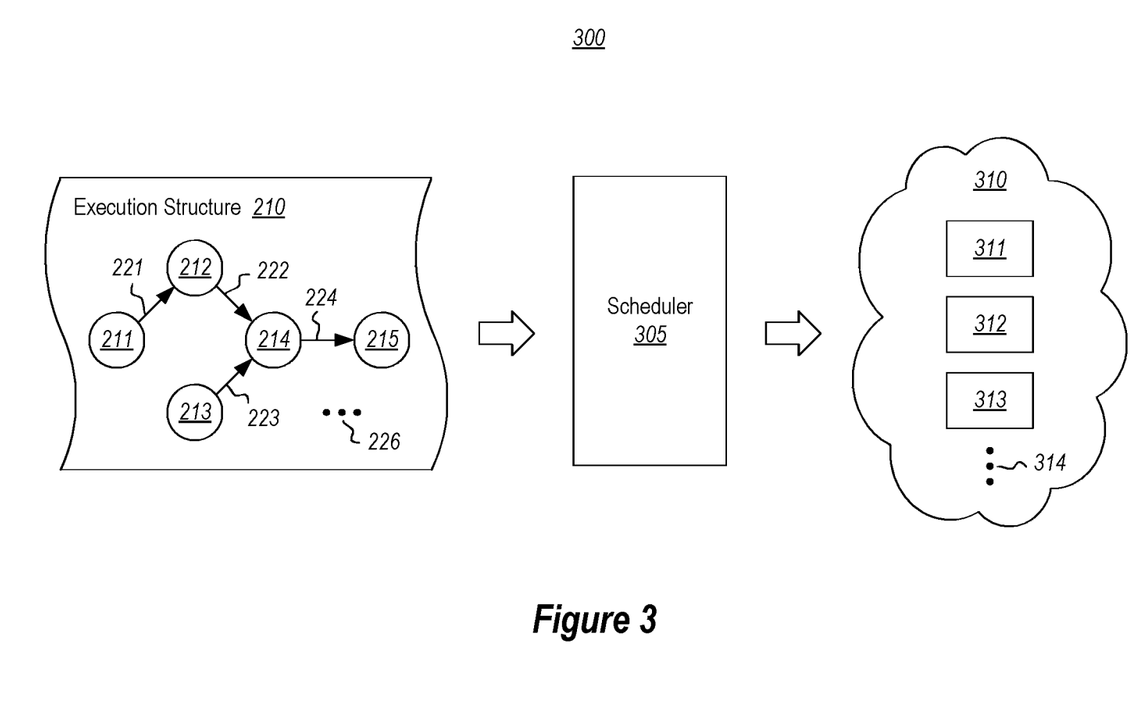
FIG. 3 illustrates an environment in which a scheduler uses the execution structure to determine when the tasks associated with a vertex is to be performed, and on what processing node within a distributed environment.

FIG. 3 illustrates an environment 300 in which a scheduler 305 uses the execution structure 210 to determine when the tasks associated with a vertex is to be performed, and on what processing node within a distributed environment 310. Again the scheduler 305 may be a computing system such as the computing system 100 of FIG. 1, or may be software that executes on such a computing system. The distributed environment 310 is illustrated as including three processing nodes 311 through 313, though the ellipses 314 symbolizes that the distributed environment may include any number of processing nodes capable of performing tasks of the job represented by the execution structure 210. In one embodiment, the distributed environment 310 is a cloud computing environment, such as a public cloud, a private cloud, or a hybrid cloud.

Figure 4:
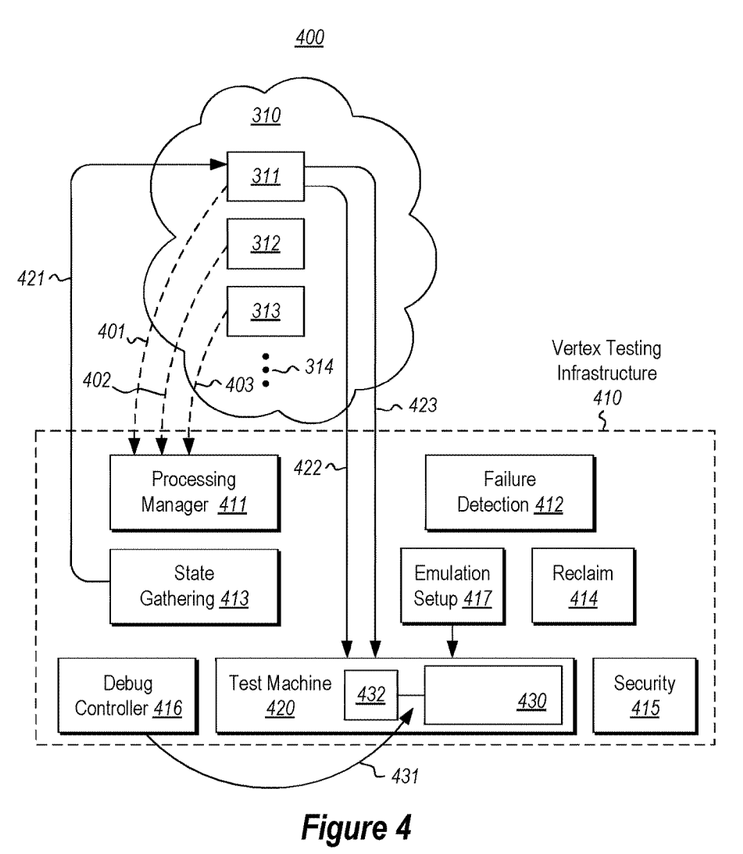
FIG. 4 illustrates an environment in which the job of multiple vertices is run in a distributed environment, and in which vertex code, data and/or state is gathered onto a test machine for evaluation by a debugger in accordance with the principles described herein.

FIG. 4 illustrates an environment 400 in which the job of multiple vertices is run. The environment 400 of FIG. 4 may essentially be the same as the environment 300 of FIG. 3 in that the environment 400 includes the distributed environment 310 of FIG. 3. However, the environment 400 also includes a vertex testing infrastructure 410. The vertex testing infrastructure 410 may be a computing system (or software running on a computing system) as described above with respect to the computing system 100 of FIG. 1. The components of the vertex testing infrastructure 410 may also be structured as described above for the computing system 100 of FIG. 1, or may be an executable component having the structure described above.

The vertex testing infrastructure 410 includes a processing manager 411, which tracks the processing of each of the vertices on each processing node. For instance, in FIG. 4, each processing node 311 through 313 might report (as illustrated by arrows 401 through 403, respectively) status of processing to the processing manager 411. From these reports, the processing manager 411 may populate a vertex data structure that keeps track of such processing. In one embodiment, the processing manager 411 is the same as the job scheduler 305 of FIG. 3.

Figure 5:
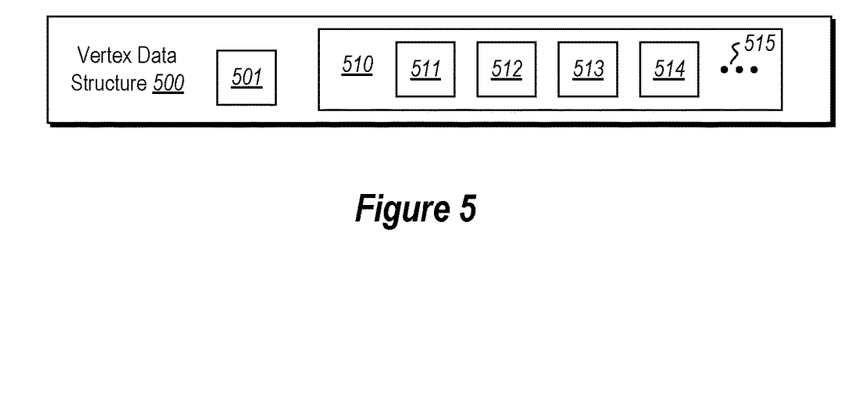
FIG. 5 illustrates an example vertex data structure for each vertex of the job.

FIG. 5 illustrates an example vertex data structure 500 for each vertex of the job. The vertex data structure 500 includes a variety of fields including a vertex identifier 501 and operational data 510. The operational data 510 includes information regarding execution of the vertex on the associated processing node scheduled by the scheduler. For instance, the operational data 510 may include a processing node identifier 511, a job result indication 512, and a duration field 513. A vertex code error field 514 indicates whether the processing node has reported that there is a problem with execution of the vertex, and the problem is due to vertex code itself (as opposed to other potential problem sources such as hardware failures on the processing node, processing node operating system failure, processing node overloading of resources, and so forth). However, the ellipses 515 represent that there may be many other fields of operational data included as well.

Referring back to FIG. 4, the vertex testing infrastructure 410 includes a failure detection module 412 configured to use the execution structure 210 generated by a job compiler to find a processing node that ran failed vertex code of a distributed job. As an example, the execution structure 210 may be used to evaluate the vertex data structures 500 for each vertex, and determine whether the vertex code error field indicates that the vertex code is not running properly due to an error in the vertex code.

The automatic finding of the failed vertex code is extremely helpful as the job provider no longer needs to treat the entire job as the entity to be debugged. Instead, the job provider can simply debug the problem vertex identified by the failure detection module 412. This automatic finding may be performed by periodically examining the vertex code error field 514 of each vertex data structure and/or by perhaps intercepting vertex code error messages from a processing node. Either way, the processing node that ran failed vertex code may be properly identified.

A test machine 420 is proximate a developer who desires to debug any failed vertices in the job. The test machine 420 may be structure as described above for the computing system 100 of FIG. 100, but may also include a user interface to allow the developer to review characteristics of the failed vertex, and potentially trigger debugging of that vertex on the test machine 420. Alternatively, the triggering of the debugging may occur automatically or in response to rule-evaluation.

To debug, a state gathering module 413 is configured to respond to the detection of failed vertex code by communicating (as represented by arrow 421) with the processing node (e.g., processing node 311) that reports failed vertex code to gather onto a test machine 420 that failed vertex code. The gathering of the vertex code onto the test machine 420 is represented by arrow 422 in FIG. 4.

The state gathering module 413 also may gather onto the text machine 420 data that the failed vertex data operated upon while the failed vertex data was operating on the processing node. Accordingly, when the failed vertex code runs on the test machine, the failed vertex code operates on the data that the failed vertex data was operating on when the failed vertex code operated on the processing node. The gathering of the data onto the test machine 420 is represented by arrow 423 in FIG. 4.

In general, the data consumed by a vertex may be quite large. Accordingly, the vertex testing infrastructure 410 and/or the processing manager 411 may include a reclaiming module 414 that deletes generated data of prior vertex code after being read by subsequent vertex code, so that the processing node can be reclaimed for use in running another vertex of the same or a different job. In such embodiments, however, the failure detection module 412 causes the reclaiming module 414 to forgo reclaiming the processing node by keeping the data on that processing node for gathering by the state gathering module 413. For instance, in the exceptional case where a problem with vertex code is detected, the failure detection module 412 instructs the reclaiming module 414 to retain the data operated upon by the problem vertex code for a period of time that will allow the state gathering module 413 to gather that data. Because this gathered data may be quite large, the state gathering module 413 may gather the data onto the test machine using a plurality of parallel processes, each process gathering a corresponding portion of the data.

The state gathering module 413 may also gather onto the test machine 420 other state of the failed vertex code. Such state may include, for instance, references to binary scheduled to run on the processing node, associated dependencies of the failed vertex code, and so forth. Such state may also include an identification of resources that are used to run the failed vertex code, so that the state gathering module 413 may use the identification or resources to access the resources for use when running the failed vertex code on the test machine. Such resource might include, as examples, dynamic link libraries, one or more related files, or the like. The gathering of the state onto the test machine 420 is also represented by arrow 423 in FIG. 4.

The state of the failed vertex code may likewise be large. Accordingly, the vertex testing infrastructure 410 and/or the processing manager 411 may include a reclaiming module 414 that deletes state of prior vertex code from the processing node after running the prior vertex code. In such embodiments, however, the failure detection module 412 causes the reclaiming module 414 to forgo reclaiming the processing node by keeping the state of the failed vertex code, much as described above for the data that was processed by the failed vertex code. Again, because this state may be quite large, the state gathering module 413 may gather the state onto the test machine using a plurality of parallel process each gathering a corresponding portion of the data.

The state gathering module 413 may operate with permission of the security module 415 to gather code, data and/or state onto the test machine 420. After all, that code, data and/or state, may be proprietary and/or sensitive, and owned by the job provider. Accordingly, the security module 415 enforces proper authentication of the test environment to be sure it is within the control of the job provider, before allowing code, data and/or state of the job to be gather on the test machine 420. Accordingly, even though the test machine 420 may be in the local presence of a debugger, security and privacy of the code is achieved, and ownership respected.

A debug environment controller 416 connects (as represented by line 431) the vertex code 430 and a debugging application 432. The debugging application then runs the vertex code 430 on the test machine 420. This connection 431 may be performed by obtaining a manifest of the vertex and environment.

Optionally, an emulator setup module 417 is configured to prepare an emulation environment for the vertex code that at least partially emulates an environment of the processing node that ran the failed vertex. As an example, the emulation environment might be a virtual machine. However, other forms of virtualization will suffice. For instance, virtualization drivers may be used to simulate network sends and receives, as well as disk reads and writes.

Figure 6:
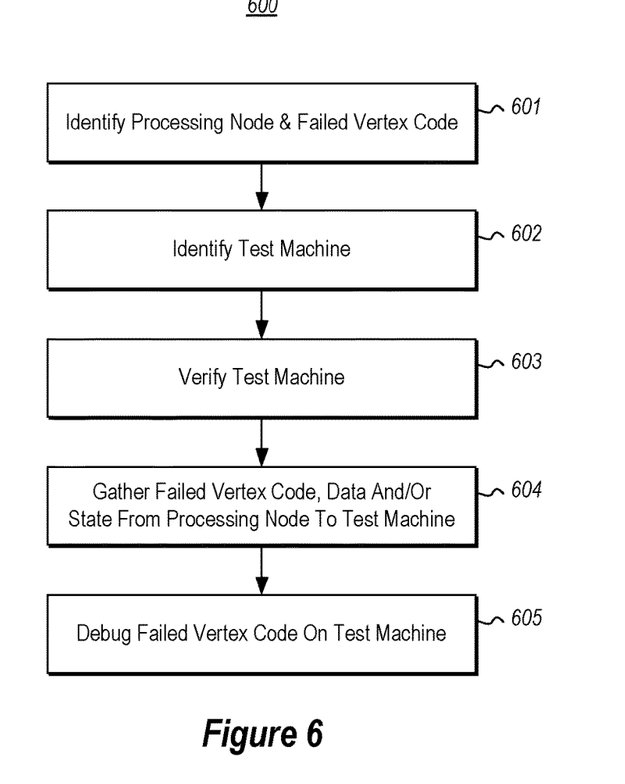
FIG. 6 illustrates a flowchart of a for debugging vertex code in accordance with the principles described herein by gathering vertex code (and potentially vertex data and/or state) from a processing node that ran failed vertex code onto a test machine for debugging on the test machine.

FIG. 6 illustrates a flowchart of a method 600 for debugging vertex code in accordance with the principles described herein. The processing node that ran failed vertex code is automatically found (act 601). Then, a test machine onto which the failed vertex code (and data and/or state) is to be gathered is identified (act 602) and verified as securely belonging to the rightful owner of the job (act 603). Then, the code, data and/or state is gather from the processing node (or from the data source that the processing node reads from) onto the test machine (act 604), whereupon the debugging occurs (act 605) on the test machine.

Accordingly, debugging may be performed conveniently on a testing machine that is outside of the distributed environment on specific problem vertices, without having to treat the entire job as an entity to be debugged. Thus, debugging of the job may be more focused on the vertices that are causing trouble, and may be more efficiently performed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising one or more processors and a memory containing executable instructions for a method of using vertex code itself to find vertex code that has caused performance problems on a node in a distributed processing system, and when executing the executable instructions, the one or more processors cause the computing system to instantiate an architecture for implementing the method, and wherein the architecture of the computing system comprising:

a compiler that receives a data processing job and compiles the job into an execution structure comprising multiple nodes, and wherein the compiler generates vertex code associated with each node, the vertex code representing a set of one or more operations to be performed by a corresponding node in the execution structure;

a scheduler that uses the execution structure to determine an order by which one or more computing tasks associated with vertex code are to be performed and on which particular node or nodes within the execution structure; and a vertex testing infrastructure comprising:

a processing manager that receives from each node of the execution structure status reports for the processing performed at the nodes, the processing manager using the status reports to populate a vertex data structure that keeps track of processing performed at each node, and wherein the vertex data structure comprises fields for recording vertex ID, node ID, job result indication and vertex code error if any, for each node providing a report to the processing manager;

a failure detection module that uses the execution structure to evaluate the vertex data structures for processing performed at each node of the execution structure, and to determine based on the evaluation of the vertex code error of each of the vertex data structures when vertex code for a given node has failed or is not running properly, and wherein the failure detection module causes the given node to retain state of the failed vertex code;

a reclaiming module that deletes generated state of prior vertex code after being read by subsequent vertex code, except when the failure detection module detects that the subsequent vertex code failed, in which case the generated state is kept for gathering by a state gathering module; and a state gathering module that gathers at least a portion of the retained state on a test machine at the vertex testing infrastructure, and that also gathers the failed vertex code for the test machine and data operated upon while the failed vertex code was processing at the given node, and wherein the gathered portion of the retained state, the gathered failed vertex code and gathered data is then used by the test machine to debug the failed vertex code.

2. The computing system in accordance with claim 1, wherein the retained state comprises references to binary scheduled to run on the given node.

3. The computing system in accordance with claim 1, wherein the retained state comprises associated dependencies of the failed vertex code.

4. The computing system in accordance with claim 1, wherein the retained state comprises an identification of resources that are used to run the failed vertex code.

5. The computing system in accordance with claim 4, wherein the state gathering module uses the identification of resources to access the resources for use when running the failed vertex code on the test machine.

6. The computing system in accordance with claim 4, wherein the resources comprise a dynamic link library.

7. The computing system in accordance with claim 4, wherein the resources comprise one or more related files.

8. The computing system of claim 1, wherein the architecture of the computing system further comprises a debugging application operating in conjunction with the failed vertex code that operates on the test machine so that the debugging application operates to debug the failed vertex code on the test machine.

9. The computing system in accordance with claim 1, wherein the state gathering module gathers the data onto the test machine using a plurality of parallel processes each gathering a corresponding portion of the data.

10. The computing system in accordance with claim 1, wherein the architecture of the computing system further comprises an emulator setup module that prepares an emulation environment on the test machine that at least partially emulates an environment of the given node that ran the failed vertex code.

11. A computer-implemented method for using vertex code itself to find vertex code that has caused performance problems on a node in a distributed processing system, the computer-implemented method comprising:

receiving at a compiler a data processing job and compiling the job into an execution structure comprising multiple nodes, and wherein the compiler generates vertex code associated with each node, the vertex code representing a set of one or more operations to be performed by a corresponding node in the execution structure;

using the execution structure at a scheduler, determining an order by which one or more computing tasks associated with vertex code are to be performed and on which particular node or nodes within the execution structure;

at a processing manager, receiving from each node of the execution structure status reports for the processing performed at the nodes, and the processing manager using the status reports to populate a vertex data structure that keeps track of processing performed at each node, and wherein the vertex data structure comprises fields for recording vertex ID, node ID, job result indication and vertex code error if any, for each node providing a report to the processing manager;

at a failure detection module, using the execution structure to evaluate the vertex data structures for processing performed at each node of the execution structure, and determining based on the evaluation of the vertex code error of each of the vertex data structures when vertex code for a given node has failed or is not running properly, and wherein the failure detection module causes the given node to retain state of the failed vertex code;

at a reclaiming module, deleting generated state of prior vertex code after being read by subsequent vertex code, except when the failure detection module detects that the subsequent vertex code failed, in which case the generated state is kept for gathering by a state gathering module; and at a state gathering module, gathering at least a portion of the retained state on a test machine at the vertex testing infrastructure, and gathering the failed vertex code for the test machine and data operated upon while the failed vertex code was processing at the given node, and wherein the gathered portion of the retained state, the gathered failed vertex code and gathered data is then used by the test machine to debug the failed vertex code.

12. The computer-implemented method in accordance with claim 11, wherein the retained state comprises references to binary scheduled to run on the given node.

13. The computer-implemented method in accordance with claim 11, wherein the retained state comprises associated dependencies of the failed vertex code.

14. The computer-implemented method in accordance with claim 11, wherein the retained state comprises an identification of resources that are used to run the failed vertex code.

15. The computer-implemented method in accordance with claim 14, wherein the state gathering module uses the identification of resources to access the resources for use when running the failed vertex code on the test machine.

16. The computer-implemented method in accordance with claim 14, wherein the resources comprise a dynamic link library.

17. The computer-implemented method in accordance with claim 14, wherein the resources comprise one or more related files.

18. The computer-implemented method in accordance with claim 11, further comprising operating a debugging application in conjunction with the failed vertex code that operates on the test machine so that the debugging application operates to debug the failed vertex code on the test machine.

19. The computer-implemented method in accordance with claim 11, further comprising preparing at an emulator setup module an emulation environment on the test machine that at least partially emulates an environment of the given node that ran the failed vertex code.

20. One or more hardware storage media storing computer-executable instructions which, when executed by one or more processors of a computing system, cause the computing system to perform a computer-implemented method of using vertex code itself to find vertex code that has caused performance problems on a node in a distributed processing system, and wherein the computer-implemented method comprises:

receiving at a compiler a data processing job and compiling the job into an execution structure comprising multiple nodes, and wherein the compiler generates vertex code associated with each node, the vertex code representing a set of one or more operations to be performed by a corresponding node in the execution structure;

using the execution structure at a scheduler, determining an order by which one or more computing tasks associated with vertex code are to be performed and on which particular node or nodes within the execution structure;

at a processing manager, receiving from each node of the execution structure status reports for the processing performed at the nodes, and the processing manager using the status reports to populate a vertex data structure that keeps track of processing performed at each node, and wherein the vertex data structure comprises fields for recording vertex ID, node ID, job result indication and vertex code error if any, for each node providing a report to the processing manager;

at a failure detection module, using the execution structure to evaluate the vertex data structures for processing performed at each node of the execution structure, and determining based on the evaluation of the vertex code error of each of the vertex data structures when vertex code for a given node has failed or is not running properly, and wherein the failure detection module causes the given node to retain state of the failed vertex code;

at a reclaiming module, deleting generated state of prior vertex code after being read by subsequent vertex code, except when the failure detection module detects that the subsequent vertex code failed, in which case the generated state is kept for gathering by a state gathering module; and at a state gathering module, gathering at least a portion of the retained state on a test machine at the vertex testing infrastructure, and gathering the failed vertex code for the test machine and data operated upon while the failed vertex code was processing at the given node, and wherein the gathered portion of the retained state, the gathered failed vertex code and gathered data is then used by the test machine to debug the failed vertex code.

* * * * *